(12) United States Patent
Strait et al.

(10) Patent No.: US 7,926,374 B2
(45) Date of Patent: Apr. 19, 2011

(54) VOICE RECOGNITION SHIFT CONTROL

(75) Inventors: Dan Strait, Davison, MI (US); Brian Douglas Howe, Shelby Township, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 992 days.

(21) Appl. No.: 11/683,803

(22) Filed: Mar. 8, 2007

(65) Prior Publication Data
US 2008/0216594 A1 Sep. 11, 2008

(51) Int. Cl.
*F16H 59/08* (2006.01)
(52) U.S. Cl. ........................................ 74/335; 74/473.12
(58) Field of Classification Search .......................... None
See application file for complete search history.

(56) References Cited

U.S. PATENT DOCUMENTS

| | | | |
|---|---|---|---|
| 6,778,895 B1 * | 8/2004 | Schwab et al. ................... | 701/51 |
| 7,146,871 B2 * | 12/2006 | Ozaki et al. ...................... | 74/335 |
| RE40,615 E * | 1/2009 | Burgbacher et al. ............. | 74/335 |
| 7,650,810 B2 * | 1/2010 | Levin et al. ............... | 74/471 XY |
| 7,845,248 B2 * | 12/2010 | Yoshiyama et al. ............. | 74/335 |
| 2008/0227591 A1 * | 9/2008 | Imamura et al. ................... | 477/3 |
| 2009/0023547 A1 * | 1/2009 | Matsubara et al. ................ | 477/3 |
| 2009/0189373 A1 * | 7/2009 | Schramm et al. ............. | 280/731 |

FOREIGN PATENT DOCUMENTS

DE    196 50 770    *   6/1997

* cited by examiner

*Primary Examiner* — Sherry Estremsky
(74) *Attorney, Agent, or Firm* — Porter, Wright, Morris & Arthur LLP; Richard M. Mescher; Dean B. Watson

(57) ABSTRACT

An electronic control system for a transmission includes a transmission controller selectively actuating the transmission between a plurality of gear positions including a reverse position and at least two forward positions, a manually-operable gear shifter selectively providing first command signals to the transmission controller to actuate the transmission between at least a portion of the plurality of gear positions, and a voice recognition system selectively providing second command signals to the transmission controller to actuate the transmission between only a portion of the plurality of gear positions. Preferably, the voice commands actuate the transmission only between the forward gear positions.

20 Claims, 3 Drawing Sheets

VOICE RECOGNITION SHIFT CONTROL

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to an electronically controlled transmission system for motor vehicles, and more particularly, an electronically controlled transmission system having voice recognition.

BACKGROUND OF THE INVENTION

An electronically controlled transmission system is commonly referred to as a "shift-by-wire" transmission system. In some shift-by-wire automatic transmission systems, the transmission input shaft is rotated by an electric actuator. The electric actuator selectively rotates the transmission input shaft in response to an input signal from a manually operated gear shifter. The vehicle operator manually operates the gear shifter to select a desired gear for the transmission. The gear shifter typically includes a lever but can alternatively be in other forms such as push buttons or the like.

"Shift-by-wire" transmission systems are desirably because they enable the gear shifter to be located virtually anywhere that can be reached by the operator because they do not have the limitations of routing mechanical cables between the gear shifter and the transmission. However, there is a never ending desire in the motor vehicle industry to simplify and modernize driver controls. There also is a never ending desire to reduce component cost and/or size. Accordingly, there is a need for an improved electronically controlled transmission systems.

SUMMARY OF THE INVENTION

The present invention provides an electronic control system for a transmission which addresses at least one of the above-noted problems of the related art. According to the present invention, an electronic control system for a transmission comprises a transmission controller selectively actuating the transmission between a plurality of gear positions including a reverse position and at least two forward positions, a manually-operable gear shifter selectively providing first command signals to the transmission controller to actuate the transmission between at least a portion of the plurality of gear positions, and a voice recognition system selectively providing second command signals to the transmission controller to actuate the transmission between only a portion of the plurality of gear positions.

According to another aspect of the present invention, an electronic control system for a transmission comprises a transmission controller selectively actuating the transmission between a plurality of gear positions including a reverse position and at least two forward positions, a manually-operable gear shifter selectively providing first command signals to the transmission controller to actuate the transmission between only a portion of the plurality of gear positions, and a voice recognition system selectively providing second command signals to the transmission controller to actuate the transmission between at least a portion of the plurality of gear positions.

According to yet another aspect of the present invention, a method of shifting a transmission comprises the steps of providing a transmission controller selectively actuating the transmission between a plurality of gear positions including a reverse position and at least two forward positions, manually-operating a gear shifter to selectively provide first command signals to the transmission controller to actuate the transmission between at least a portion of the plurality of gear positions, and issuing voice commands to a voice recognition system to selectively provide second command signals to the transmission controller to actuate the transmission between only a portion of the plurality of gear positions.

From the foregoing disclosure and the following more detailed description of various preferred embodiments it will be apparent to those skilled in the art that the present invention provides a significant advance in the technology of electronically controlled automatic transmissions. Particularly significant in this regard is the potential the invention affords for providing a high quality, reliable, easy to use, relatively small, and low cost system. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
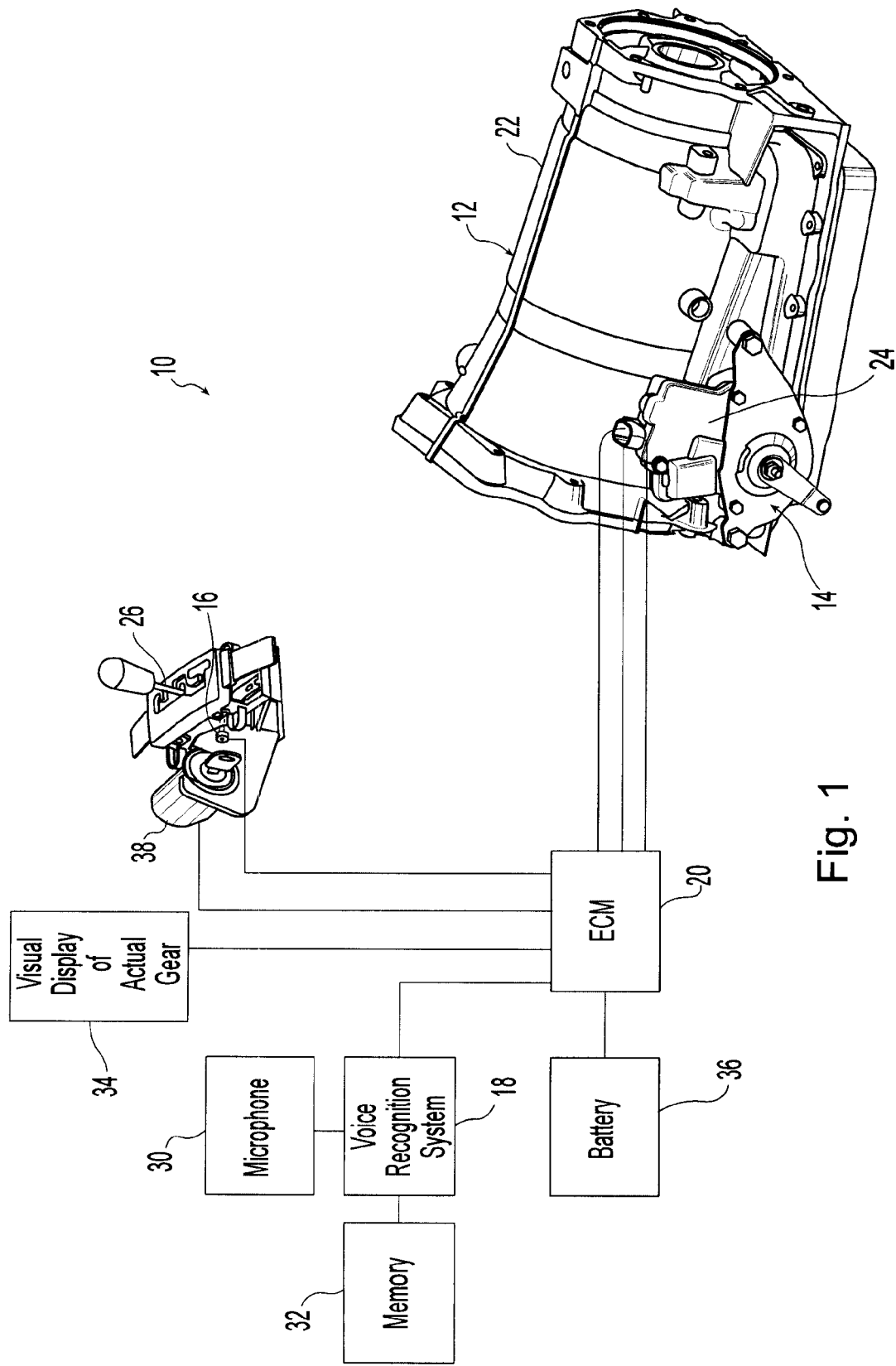
FIG. 1 is a schematic view of an electronically controlled transmission system according a preferred embodiment of the present invention.

It should be understood that the appended drawings are not necessarily to scale, presenting a somewhat simplified representation of various preferred features illustrative of the basic principles of the invention. The specific design features of the electronically controlled transmission system as disclosed herein, including, for example, specific dimensions, orientations, and shapes will be determined by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric actuator illustrated in the drawings. In general, up or upward refers to an upward direction generally within the plane of the paper in FIG. 1 and down or downward refers to a downward direction generally within the plane of the paper in FIG. 1. Also in general, forward or front refers to a direction toward the front of the motor vehicle and rearward or rear refers to a direction toward the back or rear of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electronically controlled transmission disclosed herein. The following detailed discussion of various alternative and preferred embodiments will illustrate the general principles of the invention with reference to an electronically controlled automatic transmission for a motor vehicle. Other embodiments suitable for other applications will be apparent to those skilled in the art given the benefit of this disclosure.

Figure 2:
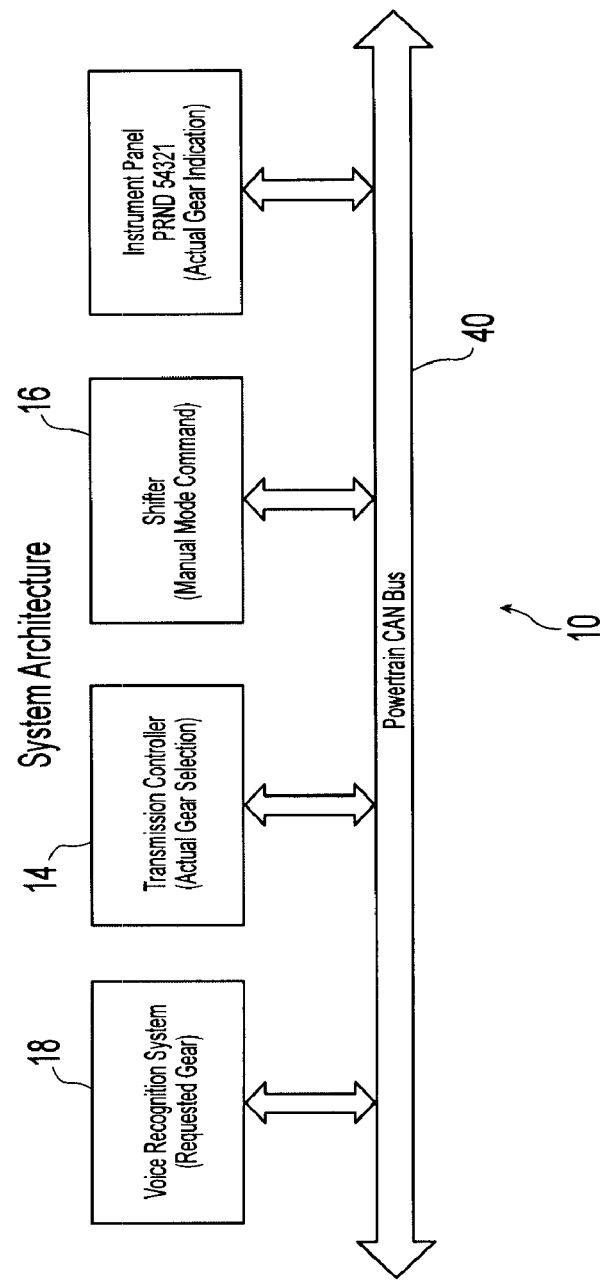
FIG. 2 is block diagram showing the system architecture for the electronically controlled transmission system of FIG. 1.
Figure 3:
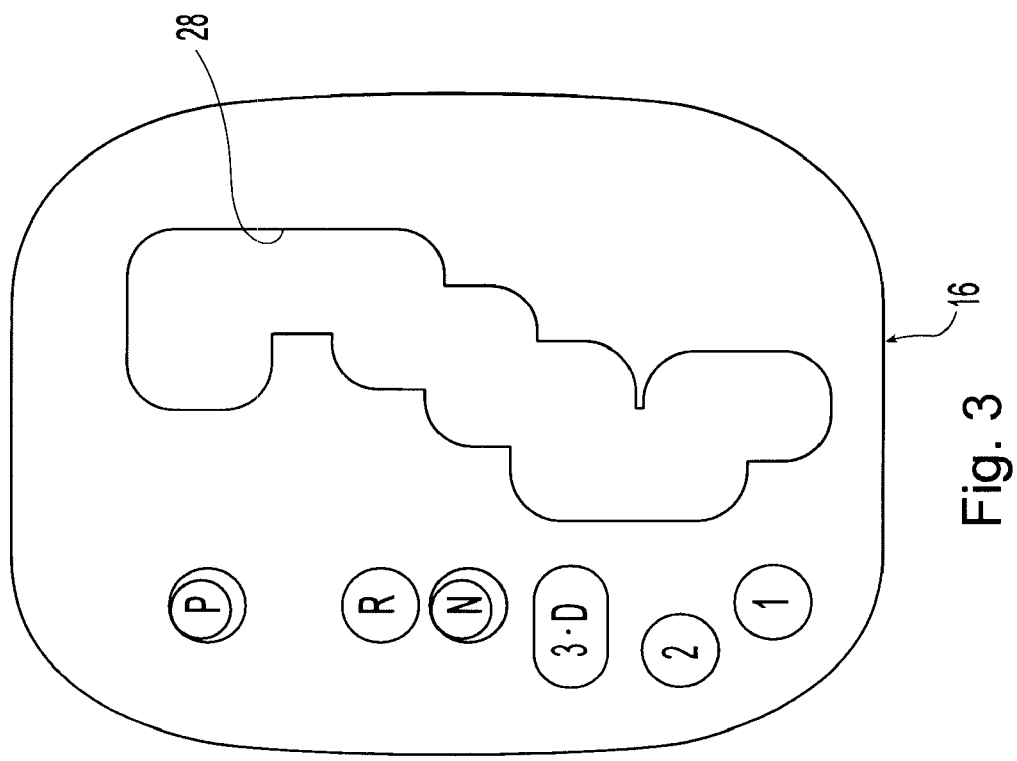
FIG. 3 is a diagrammatic view of gear shifter of the electronically transmission system of FIGS. 1 and 2.

Referring now to the drawings, FIGS. 1 to 3 schematically show an electronic control system 10 for a motor vehicle automatic transmission 12 according to a preferred embodiment of the present invention. While the illustrated embodiments of the present invention are particularly adapted for use with an automobile, it is noted that the present invention can be utilized with any suitable motor vehicle including trucks, sport utility vehicles, cross over, buses, vans, recreational vehicles, earth moving equipment and the like, off road vehicles such as dune buggies and the like, air borne vehicles, and water borne vehicles.

The illustrated electronic control system 10 includes an electric transmission controller or actuator 14 which selectively actuates the transmission 12, a manually-operable gear shifter 16 selectively providing first command signals to the transmission actuator 14 to actuate the transmission 12, a voice recognition system 18 selectively providing second command signals to the transmission actuator 14 to actuate the transmission 12, an electronic control unit or module (ECM) or controller 20 in communication with the various components for controlling the transmission actuator 14 to selectively shift the transmission 12 in response to the first and second electric command signals from the gear shifter 16 and the voice recognition system 18 respectively.

The transmission 12 has a plurality of gears or gear positions and an input shaft or lever that pivots or rotates a detent of the transmission 12 to shift between the plurality of gears of the transmission 12. The input lever typically projects laterally outward from a housing 22 of the transmission while the detent typically is located within the transmission housing 22. The illustrated transmission actuator 14 is secured to the transmission housing 22 and is operably coupled to the transmission input lever for rotating the detent in a desired manner to select a desired one of the gears in the transmission 12.

The illustrated transmission actuator 14 includes an actuator housing 24 that is secured to the housing 22 of the transmission 12. The illustrated actuator housing 24 is secured to the transmission housing 22 by a plurality of threaded fasteners but it is noted that any other suitable means for securing the actuator housing 24 can be alternatively be utilized. It is noted that the transmission actuator 14 can be of any suitable type such as, for example, the actuator disclosed in U.S. patent application Ser. No. 10/985,809, the enclosure of which is expressly incorporated herein in its entirety actuator housing 44 can have any suitable shape and can be formed of any suitable material.

The illustrated gear shifter 16 is includes a lever 26 movable over a shift path 28 having gear positions indicating the gear positions of the transmission 12. The vehicle operator manually moves the lever 26 to a position corresponding with the desired gear of the transmission 12. The illustrated gear shifter 16 includes a suitable sensor operably connected to the ECM 20 which sends a first electric command signal indicating the current gear position of the lever 26 so that transmission actuator 14 actuates the transmission 12 to the desired gear position. It is noted that the gear shifter 16 can alternatively have any other suitable configuration such as, for example, the gear shifter 16 can be a plurality of push buttons or the like.

As best shown in FIG. 3, the illustrated shift path 28 includes the gear positions of park (P), reverse (R), neutral (N), drive (3 or D), and two low gears (2 and 1) which correspond to the gears of the transmission. Thus, as the operator manually moves the illustrated lever 26 over the shift path 28, the lever 26 consecutively moves from park position (P), to the reverse position (R), to the neutral position (N), to the drive position (3 or D), to the second low gear (2), and then to the first low gear (1). While the illustrated transmission 12 and shift path 28 includes three forward gears, that is gears that positively drive the vehicle in the forward direction, it is noted that they can alternatively include a fewer or greater number of forward gears. Also, while the illustrated transmission 12 and shift path 28 includes two lower gears, it is noted that they can alternatively include a fewer or greater number of low gears. It is further noted that the transmission 12 and/or shift path 28 can alternatively include any other suitable combination or quantities of gear positions.

The illustrated voice recognition system 18 is operably connected to the ECM 20 and includes a microphone 30 or other suitable voice command input device for receiving audible voice commands from the vehicle operator. The voice recognition system 18 preferably includes a converter device for converting the voice commands to the second electric command signals. The illustrated voice recognition system 18 includes memory 32 for electronically storing reference voice commands to which the second electric command signals from the vehicle operator can be compared. It is noted, however, that the voice recognition system 18 can alternatively be of any other suitable type. When appropriately confirmed and certain predetermined conditions are met, the voice recognition system 18 sends the second electric command signal indicating the gear position desired by the vehicle operator to the transmission actuator 14 so that the first electric command signal from the gear shifter 16 is overridden and the transmission actuator 14 actuates the transmission 12 to the gear position audibly commanded by the vehicle operator. The preferred predetermined conditions for overriding the gear shifter position are that the gear shifter is in one of predetermined positions, that is, the voice recognition system 18 can cause the transmission actuator 14 to actuate the transmission 12 between only a portion of the plurality of gear positions. Preferably, the voice recognition system 18 can only cause the transmission actuator 14 to actuate the transmission 12 between forward gear positions such as the illustrated drive position (D) and second and first lower gear positions (2, 1). Thus, the voice recognition system 18 can preferably override the gear shifter 16 only when the gear shifter 16 is positioned in one of the forward gear positions (D, 2, 1). It is noted that any other suitable predetermined conditions can alternatively be utilized if desired. The voice recognition system 18 can be configured to remain active at all times the vehicle is operating or alternatively a operator input device such as a push button switch or the like can be provided so that the voice recognition system 18 is active only when initiated by the operator by activating the operator input device.

The illustrated control system 10 also includes a visual display 34 in communication with the ECM 20 and located in a position visible to the vehicle operator such as the vehicle instrument display or at the gear shifter 16. The visual display 34 provides a real time visual indication of the current or actual gear position of the transmission 12. It is noted that the location of the gear shifter 16 will not provide the actual gear position of the transmission 12 when the voice recognition system 18 has overridden the gear shifter 16. The visual display 34 can be of any suitable type.

The ECM 20 is preferably a computer unit or module having processing means and memory means. The ECM 20 is preferably the central processing unit for the motor vehicle but alternatively can be a separate stand-alone unit. The ECM 20 is electrically connected to the transmission actuator 14 in a suitable manner such as, for example, wires or cables. The ECM 20 is also electrically connected to a source of electric power in the motor vehicle such as, for example, a battery 36, in a suitable manner such as, for example, wires or cables. The ECM 20 is additionally electrically connected to the manual gear shifter 16 and the voice recognition system 18, each in a suitable manner such as, for example, wires or cables. The illustrated ECM 20 is also electrically connected to an ignition switch 38 in a suitable manner such as wires or cables. The ignition switch 38 provides a control signal to the ECM 20 which indicates when the ignition switch 38 is engaged so that the ECM 20 can prevent/permit certain transmission gear changes under selected conditions as ignition on or ignition off. The ECM 20 can also be connected to a brake interlock switch which is used by the ECM 20 to ensure that the operator is depressing a brake pedal of the motor vehicle before the ECM 20 permits the transmission gears to be shifted out of the park gear (P). As best shown in FIG. 2, the various components are preferably electrically connected via a Powertrain CAN Bus 40 of the vehicle. It is noted that any of the components can be combined as desired such as, for example, the voice recognition system 18 can be part of the ECM 20. The ECM 20 receives signals from the various components sends command signals to the transmission actuator 14 as described in more detail hereinafter.

During operation of the illustrated embodiment, the operator manually moves or pivots the manual gear shifter 16 to a position indicating a desired transmission gear such as, for example, P, R, N, D, 2, or 1, when the operator wants to change gears of the transmission 12. The ECM 20 receives the command signal from the manual gear shifter 16 indicating the desired transmission gear selected by the operator. The ECM 20 compares the desired transmission gear, indicated by the current position of the manual gear shifter 16, with the current transmission gear, indicated by the current position of the transmission actuator 14. If the desired transmission gear and the current transmission gear are not the same, the ECM 20 sends a first electric command signal to the transmission actuator 14 to actuate the transmission 12 to the desired gear position. If at any time the vehicle operator issues a voice command to change gears, the voice recognition system 18 compares the voice command to the stored reference commands. If the current gear is a forward gear (D, 2, 1) and it is an appropriate command to switch gears to one of the other forward gears (D, 2, 1), the ECM 20 sends a second electric command signal that overrides the gear shifter position to the transmission actuator 14 to actuate the transmission 12 to the desired gear position. The visual display 34 indicates the actual gear position of the transmission 12. If the current gear is not a forward gear (D, 2, 1) or the voice command is not an appropriate command to switch gears to one of the other forward gears (D, 2, 1), the ECM 20 does not override the gear shifter position.

Figure 4:
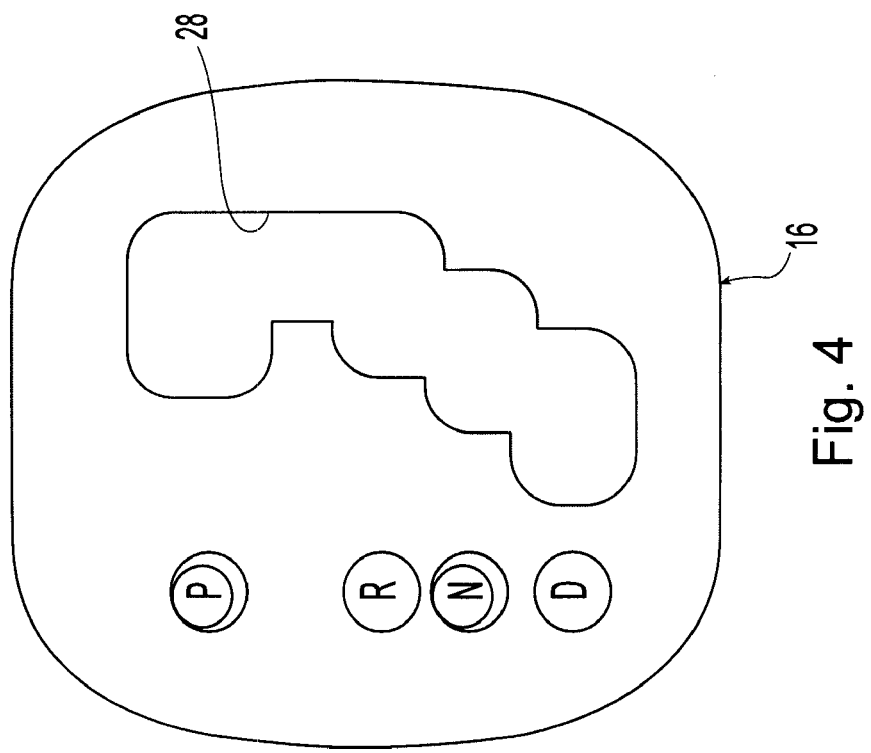
FIG. 4 is diagrammatic view of an alternative gear shifter similar to the gear shifter of FIG. 1 but wherein low gears cannot be manually obtained.

FIG. 4 illustrates a second embodiment wherein the system 10 is identical to the first embodiment described above except that the lower gear positions (2, 1) of the gear shifter 16 have been eliminated. Thus, in this embodiment, the gear shifter 16 provides the first command signals to the transmission actuator 14 to actuate the transmission 12 between only a portion of the plurality of gear positions, that is, all of the gear positions except the lower gear positions. The change the transmission 12 to the lower gear positions (2, 1), the voice recognition system 18 must be utilized. It is noted that this embodiment permits the size of the gear shifter 16 to be reduced by reducing the length of the shift path 28.

It should be appreciated from the foregoing detailed description of the present invention that the control system 10 according to the present invention reduces gear shifter 16 component cost, simplifies driver control, and modernizes the gear selection method. Additionally, the second embodiment greatly reduces the size of the gear shifter 18 by reducing the required travel to achieve the lower gear positions (2, 1) or remove the range selection features of the gear shifter 16.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An electronic control system for a transmission, said system comprising, in combination:
   a transmission controller selectively actuating the transmission between a plurality of gear positions including a reverse position and at least two forward positions;
   a manually-operable gear shifter selectively providing first command signals to the transmission controller to actuate the transmission between at least a portion of the plurality of gear positions; and
   a voice recognition system selectively providing second command signals to the transmission controller to actuate the transmission between only a portion of the plurality of gear positions.

2. The system according to claim 1, wherein the plurality of gear positions includes a reverse position, a drive position, and at least one low gear position.

3. The system according to claim 2, wherein the plurality of gear positions includes a reverse position, a drive position, and at least two low gear positions.

4. The system according to claim 2, wherein the voice recognition system selectively provides the second command signals to actuate the transmission between only the drive position and the at least one low gear position.

5. The system according to claim 1, wherein the voice recognition system selectively provides the second command signals to actuate the transmission between only the at least two forward positions.

6. The system according to claim 1, wherein the gear shifter selectively provides the first command signals to actuate the transmission between only a portion of the plurality of gears.

7. The system according to claim 6, wherein the plurality of gear positions includes a reverse position, a drive position, and at least one low gear position and wherein the gear shifter does not actuate the transmission to the at least one low gear position.

8. The system according to claim 7, wherein the voice recognition system selectively provides the second command signals to actuate the transmission between only the drive position and the at least one low gear position.

9. The system according to claim 7, further comprising a visual display for displaying a current one of the plurality of gear positions of the transmission.

10. An electronic control system for a transmission, said system comprising, in combination:
   a transmission controller selectively actuating the transmission between a plurality of gear positions including a reverse position and at least two forward positions;
   a manually-operable gear shifter selectively providing first command signals to the transmission controller to actuate the transmission between only a portion of the plurality of gear positions; and
   a voice recognition system selectively providing second command signals to the transmission controller to actuate the transmission between at least a portion of the plurality of gear positions.

11. The system according to claim 10, wherein the plurality of gear positions includes a reverse position, a drive position, and at least one low gear position.

12. The system according to claim 11, wherein the plurality of gear positions includes a reverse position, a drive position, and at least two low gear positions.

13. The system according to claim 11, wherein the gear shifter does not actuate the transmission to the at least one low gear position.

14. The system according to claim 10, wherein the gear shifter actuates the transmission to only one of the at least two forward positions.

15. The system according to claim 10, wherein the voice recognition system selectively provides the second command signals to actuate the transmission between a portion of the plurality of gear positions.

16. The system according to claim 15, wherein the voice recognition system selectively provides the second command signals to actuate the transmission between only the at least two forward positions.

17. The system according to claim 15, wherein the plurality of gear positions includes a reverse position, a drive position, and at least one low gear position and wherein the voice recognition system selectively provides the second command signals to actuate the transmission between only the drive position and the at least one low gear position.

18. The system according to claim 10, further comprising a visual display for displaying a current one of the plurality of gear positions of the transmission.

19. A method of shifting a transmission, said method comprising the steps of, in combination:
   providing a transmission controller selectively actuating the transmission between a plurality of gear positions including a reverse position and at least two forward positions;
   manually-operating a gear shifter to selectively provide first command signals to the transmission controller to actuate the transmission between at least a portion of the plurality of gear positions; and
   issuing voice commands to a voice recognition system to selectively provide second command signals to the transmission controller to actuate the transmission between only a portion of the plurality of gear positions.

20. The method according to claim 19, wherein the voice commands actuate the transmission to only one of the at least two forward gear positions.

\* \* \* \* \*